(12) United States Patent
Lee et al.

(10) Patent No.: US 11,477,468 B2
(45) Date of Patent: Oct. 18, 2022

(54) METHOD AND DEVICE FOR COMPRESSING IMAGE AND NEURAL NETWORK USING HIDDEN VARIABLE

(71) Applicant: Electronics and Telecommunications Research Institute, Daejeon (KR)

(72) Inventors: Joo-Young Lee, Daejeon (KR); Seung-Hyun Cho, Daejeon (KR); Youn-Hee Kim, Daejeon (KR); Jin-Wuk Seok, Daejeon (KR); Woong Lim, Daejeon (KR); Jong-Ho Kim, Daejeon (KR); Dae-Yeol Lee, Daejeon (KR); Se-Yoon Jeong, Daejeon (KR); Hui-Yong Kim, Daejeon (KR); Jin-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 343 days.

(21) Appl. No.: 16/760,609

(22) PCT Filed: Oct. 30, 2018

(86) PCT No.: PCT/KR2018/013013
§ 371 (c)(1),
(2) Date: Apr. 30, 2020

(87) PCT Pub. No.: WO2019/088657
PCT Pub. Date: May 9, 2019

(65) Prior Publication Data
US 2020/0351509 A1    Nov. 5, 2020

(30) Foreign Application Priority Data

Oct. 30, 2017 (KR) .......................... 10-2017-0142066
Oct. 30, 2018 (KR) .......................... 10-2018-0130680

(51) Int. Cl.
*H04N 7/12* (2006.01)
*H04N 19/42* (2014.01)
(Continued)

(52) U.S. Cl.
CPC ............... *H04N 19/42* (2014.11); *G06N 3/04* (2013.01); *G06N 3/082* (2013.01); *H04N 19/136* (2014.11)

(58) Field of Classification Search
CPC .................................................... H04N 10/136
See application file for complete search history.

(56) References Cited

U.S. PATENT DOCUMENTS 6,393,060 B1    5/2002  Jeong
9,876,790 B2    1/2018  Jo et al.
(Continued)

FOREIGN PATENT DOCUMENTS

KR    1020000031283 A    6/2000
KR    1020160001648 A    1/2016
(Continued)

OTHER PUBLICATIONS

Vivienne Sze et al., "Efficient Processing of Deep Neural Networks: A Tutorial and Survey" Aug. 13, 2017, pp. 1-32, Cornell University.
(Continued)

*Primary Examiner* — Y Lee
(74) *Attorney, Agent, or Firm* — William Park & Associates Ltd.

(57) ABSTRACT

A method and apparatus for image compression using a latent variable are provided. The multiple components of the latent variable may be sorted in order of importance. Through sorting, when the feature information of only some of the multiple components is used, the quality of a reconstructed image may be improved. In order to generate a latent variable, the components of which are sorted in order of importance, learning may be performed in various manners. Also, less important information may be eliminated from the latent variable, and processing, such as quantization, may be applied to the latent variable. Through elimination and processing, the amount of data for the latent variable may be reduced.

19 Claims, 9 Drawing Sheets

(51) Int. Cl.
  *H04N 19/136* (2014.01)
  *G06N 3/04* (2006.01)
  *G06N 3/08* (2006.01)

(56) References Cited

U.S. PATENT DOCUMENTS

2017/0069094 A1  3/2017  Kim
2017/0104993 A1  4/2017  Jeong et al.
2017/0230675 A1  8/2017  Wierstra et al.

FOREIGN PATENT DOCUMENTS

KR    101791573 B1   10/2017
WO    2017136083 A1   8/2017

OTHER PUBLICATIONS

A. Krizhevsky et al., "Using Very Deep Autoencoders for Content-Based Image Retrieval," In European Symposium on Artificial Neural Networks, 2011. pp. 1-7.
George Toderic et al., "Variable rate image compression with recurrent neural networks," ICLR 2016, Mar. 2016, pp. 1-12.
Joo-Young Lee et al., "Research on transformative artificial neural network for image compression," 30th Workshop on Image Processing and Image Understanding (IPIU 2018), Feb. 7, 2018, pp. 1-5.

FIG. 12

METHOD AND DEVICE FOR COMPRESSING IMAGE AND NEURAL NETWORK USING HIDDEN VARIABLE

TECHNICAL FIELD

The following embodiments relate generally to a method and apparatus for image compression, and more particularly, to a method and apparatus for compressing an image and a neural network using a latent variable.

BACKGROUND ART

The demand for ultra-high-definition and high-quality images is increasing in various application fields. As the resolution and quality of an image become higher, the amount of data that must be transmitted for the image increases, and the cost of storing and transmitting the data of the image also increases.

In order to solve these problems while still realizing an ultra-high-definition and high-quality image, a high-efficiency image-encoding and/or -decoding method is required.

In the case of conventional image-encoding and/or -decoding algorithms, although the complexity for improving performance is exponentially increased, the performance increase is gradually reduced. Accordingly, research on video encoding and/or decoding using a deep-learning-based neural network has commenced, and a compression technique based on an autoencoder, which is a type of neural network, has been the main focus of study.

An autoencoder-based neural network for image compression is configured to include an encoder neural network and a decoder neural network. The encoder neural network receives an image as input and generates a lower-dimensional latent variable, which is referred to as a bottleneck. The decoder neural network receives a latent variable as input and reconstructs an image using the received latent variable.

Neural network pruning is a neural network compression method that speeds up the execution of the network by reducing the number of parameters, and is technology for maintaining the performance of the neural network to the greatest extent possible even though the number of parameters is reduced.

Furthermore, in various fields, the complexity and the performance of a neural network have a trade-off relationship therebetween, and the required ratio of the performance to the complexity may vary depending on the purpose of applying the neural network and the environment in which the neural network is applied. For example, when image and video compression is performed, a compression ratio and distortion (in other words, the required bitrate and the quality of a reconstructed image) have a trade-off relationship therebetween, and a different performance level may be required depending on the application field in which the image and video compression is used. Using a neural network pruning method, neural networks having different performance levels and different complexity levels may be derived from a single neural network.

DISCLOSURE

Technical Problem

An embodiment may provide an apparatus and method for performing encoding and/or decoding of an image using a latent variable having sorted components.

An embodiment may provide an apparatus and method for performing neural network pruning using a latent variable having sorted components.

Technical Solution

In one aspect, there is provided a processing method, which includes acquiring a latent variable; and performing selection or processing related to the latent variable, wherein multiple components of the latent variable are sorted in a specific order.

The multiple components may be sorted in order of importance.

The latent variable may be acquired through an encoder neural network that is trained in advance.

Loss in learning in a neural network may include reconstruction loss and a sparsity penalty.

The sparsity penalty may be a sum of the values of the multiple components of the latent variable to which weights are assigned, respectively.

The weight assigned to each of the multiple components may be related to the frequency with which feature information represented by the component is used in input images that are used for learning.

In learning in a neural network configured with multiple learning steps, elements of only some components having high-ranking indices, among the multiple components of the latent variable, may be activated in each of the multiple steps.

The number of activated components having the high-ranking indices may be randomly set.

Loss in learning in the neural network may be reconstruction loss.

Whether to activate each of the multiple components of the latent variable is determined, whereby a probability that the component affects the magnitude of the reconstruction loss may be adjusted.

The selection may be eliminating, from the latent variable, information that is less important for reconstruction of an image.

The processing may be reducing the amount of data for the latent variable by eliminating a specific component, among the multiple components of the latent variable.

The specific component may be at least one component having the lowest importance.

The processing may be quantization for the latent variable.

In another aspect, there is provided a processing method, which includes generating a reconstructed image using a decoder neural network to which a latent variable is applied, wherein multiple components of the latent variable are sorted in a specific order.

The multiple components may be sorted in order of importance.

The processing method may further include generating the latent variable using latent variable generation information.

The reconstructed image may be generated using feature information of only some high-ranking components, among the multiple components of the latent variable.

The ranking of each of the multiple components may be determined based on the component index thereof.

In a further aspect, there is provided a computer-readable recording medium in which a bitstream is stored.

The bit stream may include latent variable generation information.

A latent variable may be generated using the latent variable generation information.

A reconstructed image may be generated using a decoder neural network to which the latent variable is applied.

The multiple components of the latent variable may be sorted in a specific order.

Additionally, other methods, devices, and systems for implementing the present invention and a computer-readable recording medium for recording a computer program for implementing the above-described methods are further provided.

Advantageous Effects

An apparatus and method for performing encoding and/or decoding of an image using a latent variable having sorted components are provided.

An apparatus and method for performing neural network pruning using a latent variable having sorted components are provided.

DESCRIPTION OF DRAWINGS

FIG. 12 illustrates a method for providing neural networks having different performance levels based on a single trained neural network to which a neural-network-pruning method according to an example is applied.

BEST MODE

Figure 1:
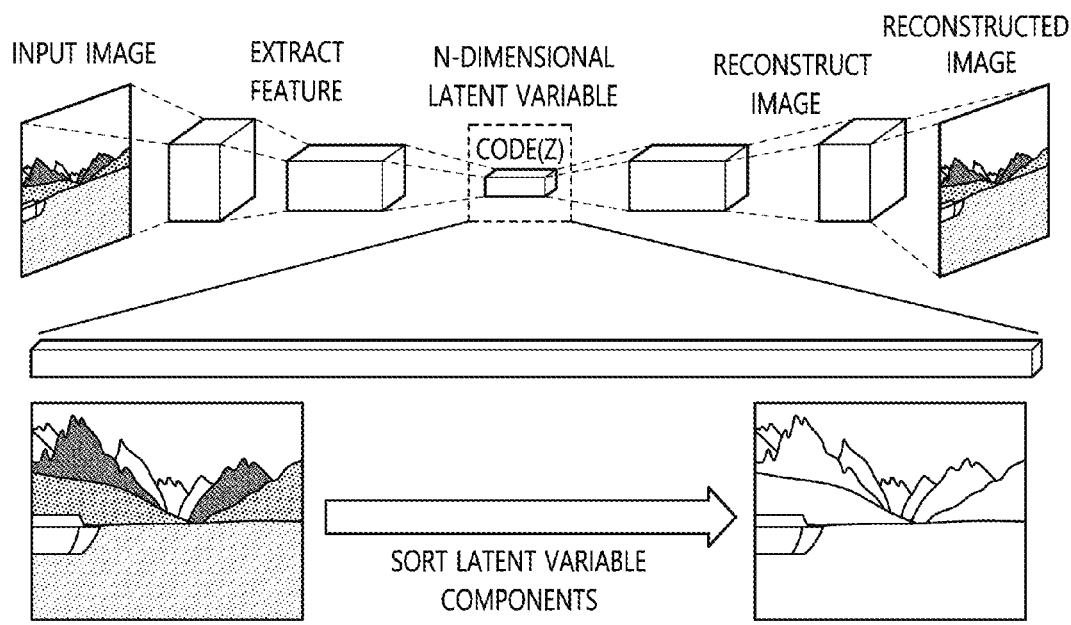
FIG. 1 illustrates the relationship between an input image, a reconstructed image, and a latent variable according to an example.

Specific embodiments will be described in detail below with reference to the attached drawings. These embodiments are described in sufficient detail to enable those skilled in the art to practice the present invention. It should be understood that the embodiments differ from each other, but the embodiments do not need to be exclusive of each other. For example, a particular feature, structure, or characteristic described herein in connection with one embodiment may be implemented in another embodiment without departing from the spirit or scope of the present invention. Also, it should be understood that the location or arrangement of individual elements in the disclosed embodiments may be changed without departing from the spirit or scope of the present invention. Therefore, the following detailed description is not to be taken in a limiting sense, and if appropriately interpreted, the scope of the exemplary embodiments is limited only by the appended claims, along with the full range of equivalents to which the claims are entitled.

The same reference numerals are used to designate the same or similar elements throughout the drawings. The shapes, sizes, etc. of components in the drawings may be exaggerated to make the description clear.

Terms used herein are for the purpose of describing particular embodiments only and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

It will be understood that, although the terms "first," "second," etc. may be used herein to describe various elements, these elements should not be limited by these terms. These terms are only used to distinguish one element from another element. For instance, a first element discussed below could be referred to as a second element without departing from the teachings of the present invention. Similarly, a second element could also be referred to as a first element.

Also, element modules described in the embodiments of the present invention are independently shown in order to indicate different characteristic functions, but this does not mean that each of the element modules is formed of a separate piece of hardware or software. That is, element modules are arranged and included for convenience of description, and at least two of the element units may form one element unit, or one element may be divided into multiple element units and the multiple element units may perform respective functions. An embodiment into which the elements are integrated or an embodiment from which some elements are removed is included in the scope of the present invention, as long as it does not depart from the essence of the present invention.

Also, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention.

Hereinafter, embodiments of the present invention are described with reference to the accompanying drawings in order to describe the present invention in detail so that those having ordinary knowledge in the technical field to which the present invention pertains can easily practice the present invention. In the following description of the present invention, detailed descriptions of known functions and configurations which are deemed to make the gist of the present invention obscure will be omitted.

Hereinafter, the terms "latent variable", "latent vector", "hidden variable" and "hidden vector" used herein may have the same meaning and/or similar meanings, and may be used interchangeably with each other.

Hereinafter, the terms "dimension" and "component" used herein may have the same meaning and/or similar meanings, and may be used interchangeably with each other.

With the outstanding performance of an artificial neural network in various fields, compression technology based thereon is also the focus of continual research in image compression fields. One of the fields in which such research is performed is an image compression method using a convolutional autoencoder. The autoencoder functions to map data in an input space onto a lower-dimensional manifold space. Latent variable data mapped onto a lower-dimensional space through a process including mapping is compressed into a bitstream through quantization and entropy coding processes. That is, when it is compared with the structure of an existing image codec, the convolutional autoencoder may be regarded as providing a kind of transform function. In the existing image codec, a Discrete Cosine Transform (DCT) method, which provides a high energy compaction property, is mainly used. However, because the DCT method does not take correlation between the channels of an input image into account, inefficiency is caused from the aspect of energy compaction. In embodiments, a transform method that provides better energy compaction performance than the existing 2D DCT using an artificial neural network based on a convolutional autoencoder is described. This transform method may be referred to as a transformative autoencoder.

FIG. 1 illustrates the relationship between an input image, a reconstructed image, and a latent variable according to an example.

An autoencoder may be an artificial neural network for transforming input image data into a latent variable space. Because the coefficients of the transformed latent variable have an energy compaction property, image information may be represented using a smaller number of components thanks to the coefficients of the transformed latent variable.

The component of a latent variable may be a single value configuring the latent variable. Alternatively, the component of a latent variable may be a set of values acquired from the same feature filter. When the component of a latent variable is a set, an index for identifying the component may be an index for distinguishing the specific set from multiple sets. For example, when a neural network is configured using a convolutional layer, a component may indicate the channel of a latent variable, and the index of the component may indicate the index of the channel.

The existing autoencoder-based image compression technology is advantageous in terms of a decrease in dimensionality. However, existing autoencoder-based image compression technology may not consider the importance of each component in a latent variable.

That is, when an image is encoded using a trained neural network, the extent of the effect of each component of a latent variable, corresponding to the result of learning in the encoder neural network, on a reconstructed image, that is, the importance of each component, may not be detected. In contrast, when learning is performed such that the components of a latent variable are sorted based on the extent of the effect on the reconstructed image, the latent variable is selectively used based thereon, whereby image compression efficiency may be improved.

FIG. 1 illustrates a latent variable of an autoencoder. The components of the latent variable may be sorted in order of importance.

An encoder neural network may receive an input image and extract the feature information of the input image. The encoder neural network may configure a latent variable based on the extracted feature information. A decoder neural network may receive the latent variable and reconstruct an image using the received latent variable. The decoder neural network may output the reconstructed image.

A latent variable may include N components. Each of the N components of the latent variable may represent unique feature information about the input image. The feature information may represent the various features of the input image, such as brightness, a color, a shape, and the like, trained through the encoder neural network.

In regard to the sorted components of the latent variable, it may be assumed that a component includes more important feature information for reconstructing an image as the index thereof is lower. For example, the feature information of a low-frequency component, which is regarded as being important in a Human Visual System (HVS), may be represented using a component having a low index. Also, when the index of a component is high, the component may be used to represent the feature information of a high-frequency component. That is, a component having a lower index may be regarded as a more highly ranked component.

When a DCT transform method is used, the value of a coefficient becomes higher as the input is closer to a DC component. Similar to the DCT transform method, as the extent of the effect of information on the reconstruction of an image is greater, the autoencoder may concentrate the corresponding information on a component that is ranked higher based on the index in the latent variable.

The pieces of feature information sorted in order of importance may be variously used for learning depending on the learning method for a neural network.

Figure 2:
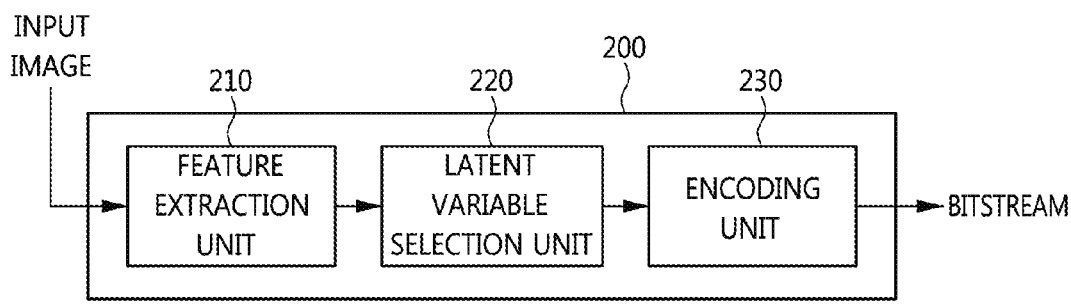
FIG. 2 is a block diagram of an encoder according to an embodiment.

FIG. 2 is the block diagram of an encoder according to an embodiment.

The encoder 200 may receive an input image and generate a bitstream.

The encoder 200 may include a feature extraction unit 210, a latent variable selection unit 220, and an encoding unit 230.

The functions and operations of the feature extraction unit 210, the latent variable selection unit 220, and the encoding unit 230 will be described below with reference to FIG. 4 and the like.

Figure 3:
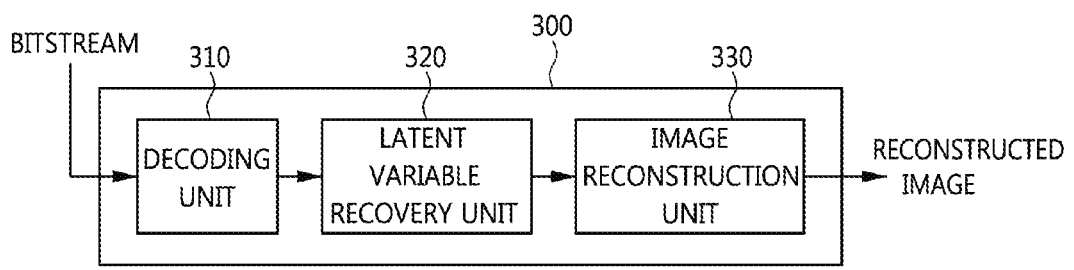
FIG. 3 is a block diagram of a decoder according to an embodiment.

FIG. 3 is a block diagram of a decoder according to an embodiment.

The decoder 300 may receive a bitstream and generate a reconstructed image.

The decoder 300 may include a decoding unit 310, a latent variable recovery unit 320, and an image reconstruction unit 330.

The functions and operations of the decoding unit 310, the latent variable recovery unit 320, and the image reconstruction unit 330 will be described below with reference to FIG. 5 and the like.

Figure 4:
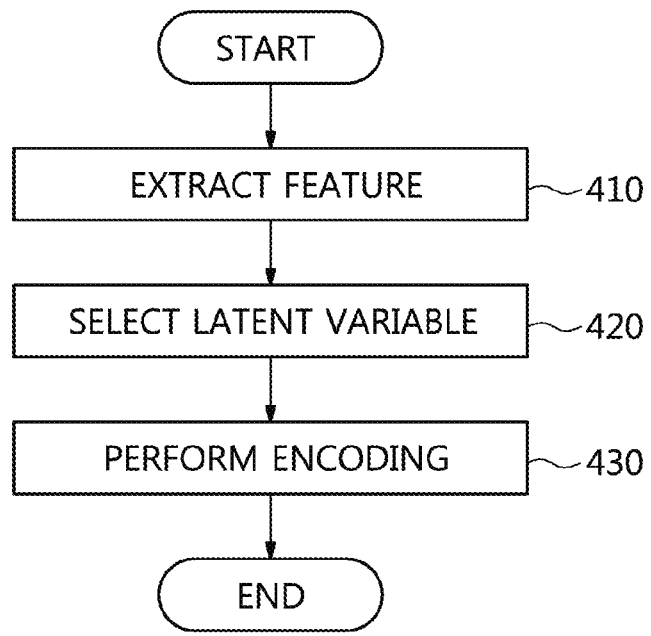
FIG. 4 is a flowchart of an encoding method according to an embodiment.

FIG. 4 is a flowchart of an encoding method according to an embodiment.

The encoder 200 may receive an input image and generate an encoded bitstream by encoding the input image.

At step 410, the feature extraction unit 210 may acquire a latent variable.

The encoder 200 may include an encoder neural network. Alternatively, the encoder 200 may manage learning in the encoder neural network. The encoder 200 may perform learning in the encoder neural network using input images. Based on learning in the encoder neural network, the latent variable of the encoder neural network may be configured.

The feature extraction unit 210 may acquire the latent variable through the encoder neural network, which is trained in advance. The acquired latent variable may have components sorted in a specific order.

The latent variable may have N components. The latent variable having components that are sorted in a specific order may mean that the N components thereof are sorted in the specific order. Alternatively, sorting the components of a latent variable in a specific order may mean sorting the N components thereof in the specific order.

For example, the specific order may be the sequence according to importance. For example, through the encoder neural network, which is trained in advance, the feature extraction unit 210 may acquire a latent variable, the components of which are sorted in order of importance.

At step 420, the latent variable selection unit 220 may perform selection or processing related to the latent variable.

The latent variable selection unit 220 may generate latent variable generation information by performing selection or processing related to the latent variable. The latent variable generation information may be information that is used to generate a latent variable to which the selection or processing is applied. The format of the latent variable generation information may differ from the format of the latent variable.

For example, the latent variable selection unit 220 may eliminate information that is not important for the reconstruction of the image from the latent variable. Alternatively, information having high importance may be selectively extracted from the latent variable.

For example, the latent variable selection unit 220 eliminates a specified component from the N components of the latent variable, thereby reducing the amount of data for the latent variable. The specified component may be a component having low importance. Assuming that the N components of the latent variable are sorted in order from the lowest importance to the highest importance, the latent variable selection unit 220 may eliminate the first M components therefrom. Here, M may be an integer that is less than N. Alternatively, the latent variable selection unit 220 may eliminate at least one component having the lowest importance from the N components of the latent variable.

For example, the latent variable, the components of which are sorted in order of importance, may have an energy compaction property. The latent variable selection unit 220 performs quantization for the latent variable, thereby eliminating a low energy value from the latent variable.

At step 430, the encoding unit 230 may perform entropy coding.

For example, the encoding unit 230 performs entropy coding for the output from the latent variable selection unit 220, thereby generating an encoded bitstream.

The output from the latent variable selection unit 220 may include the latent variable generation information.

The encoded bitstream may include information about the encoded image.

The step 430 may be optional.

Figure 5:
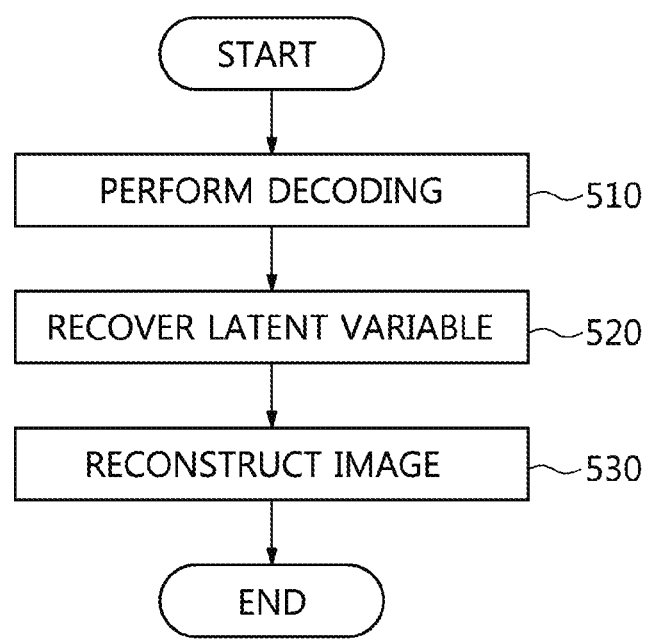
FIG. 5 is a flowchart of a decoding method according to an embodiment.

FIG. 5 is a flowchart of a decoding method according to an embodiment.

The decoder 300 may receive the encoded bitstream and generate a reconstructed image by performing decoding using the encoded bitstream.

At step 510, the decoding unit 310 performs entropy decoding for the encoded bitstream, thereby generating the input to the latent variable recovery unit 320.

The input to the latent variable recovery unit 320 may include the latent variable generation information.

The step 510 may be optional.

At step 520, the latent variable recovery unit 320 may generate a latent variable using the latent variable generation information. Here, the generated latent variable may be a latent variable having components that are sorted in a specific order.

As described above, at step 420, through selection or processing related to the latent variable, latent variable generation information having a format that is different from the format of the latent variable may be generated. Here, selection or processing may include elimination of a component, quantization, and the like.

For example, generating a latent variable using the latent variable generation information may include the initialization or recovery of the eliminated component of the latent variable. Alternatively, generating a latent variable may include restoring the quantized latent variable to the previous form, to which quantization is not yet applied.

The latent variable recovery unit 320 may generate a latent variable that is interpretable by the decoder neural network of the decoder 300 using the latent variable generation information. For example, the latent variable generation information may be transformed into the format of the latent variable by the latent variable recovery unit 320.

At step 530, the image reconstruction unit 330 may apply the recovered latent variable to the decoder neural network and generate a reconstructed image using the decoder neural network to which the recovered latent variable is applied.

The reconstructed image may be an image that is as similar as possible to the input image.

Figure 6:
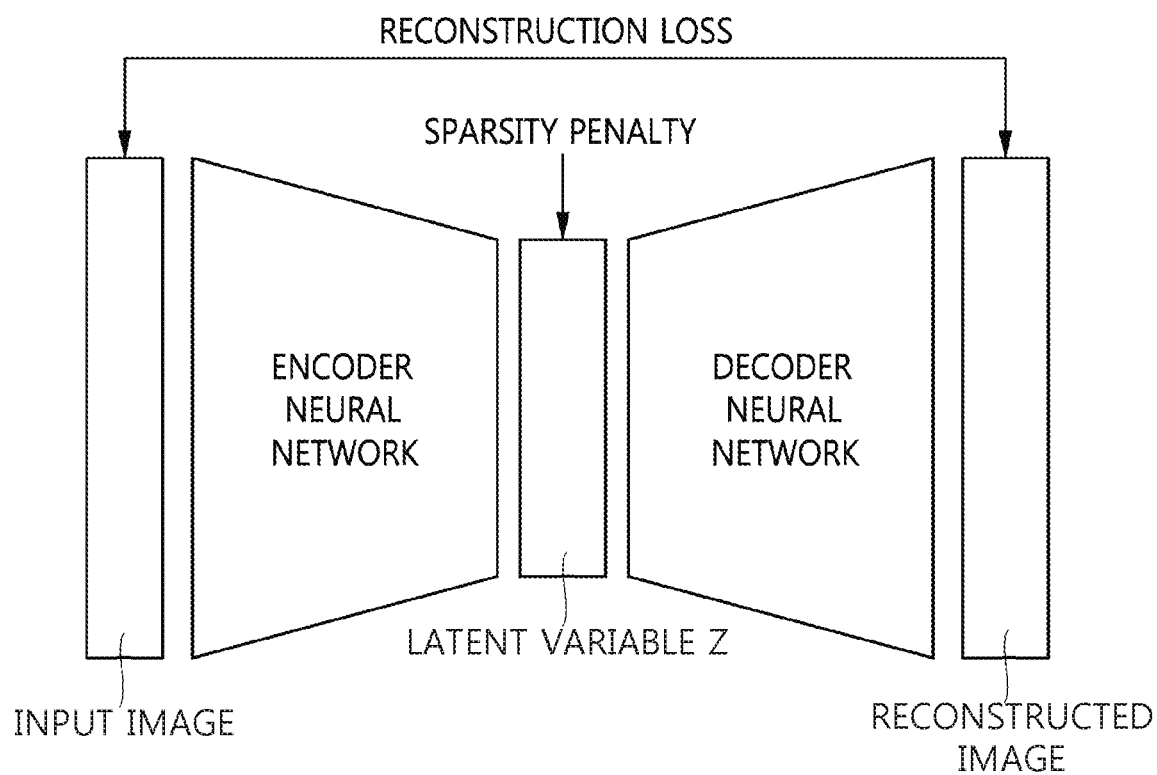
FIG. 6 shows a learning method for sorting the components of a latent variable in order of importance according to an embodiment.

FIG. 6 shows a learning method for sorting the components of a latent variable in order of importance according to an embodiment.

The conventional autoencoder may perform learning in a neural network based on the difference between an input image and a reconstructed image (that is, based on reconstruction loss). However, when learning based only on reconstruction loss is performed, the feature information included in the components of a latent variable may not be sorted according to the importance thereof. When the pieces of feature information of the components of the latent variable are not sorted in order of importance, components including feature information that greatly affects the quality of the reconstructed image and components including feature information that less affects the quality thereof may be randomly arranged.

The effect of sorting of the components of a latent variable may be clearly seen when a reconstructed image is generated using the feature information of only some high-ranking components, among the components of the latent variable.

In an embodiment, the generation of a reconstructed image may be performed using only some high-ranking components, among the multiple components of the latent variable. The multiple components may be N components. Here, the ranking (that is, a high ranking or low ranking) of each of the multiple components may be determined based on the component index thereof. For example, the lower the component index of a component, the higher the ranking of the component.

When all of the pieces of information of a latent variable (that is, the feature information of all of the components) are used to generate a reconstructed image, the quality of the reconstructed image generated using the latent variable, the components of which are sorted, may be almost the same as the quality of the reconstructed image generated using the latent variable, the components of which are not sorted.

In contrast, when some of the pieces of information of a latent variable (that is, some high-ranking components, among all of the components) are used to generate a reconstructed image, the quality of the reconstructed image generated using the latent variable, the components of which are sorted, may be higher than the quality of the reconstructed image generated using the latent variable, the components of which are not sorted. Particularly, the smaller the number of components used for the generation of a reconstructed image, the larger the difference between the quality of the reconstructed image generated using a latent variable, the components of which are sorted, and that of the reconstructed image generated using the latent variable, the components of which are not sorted.

When a latent variable having unsorted components is used, the quality of the reconstructed image may increase linearly depending on the number of components that are used for the reconstruction. Here, in order to acquire a reconstructed image having high quality, it is necessary to use all of the components of the latent variable.

In contrast, when a latent variable having sorted components is used, feature information having a greater effect on the quality of a reconstructed image may be included in a high-ranking component of the latent variable. Accordingly, when the latent variable having sorted components is used, a high-quality reconstructed image may be acquired using the pieces of feature information of a smaller number of components.

FIG. 6 illustrates a learning method for sorting the components of a latent variable in order of importance according to an embodiment.

In an embodiment, in terms of learning in a neural network, loss may include reconstruction loss and differential sparsity penalties. That is, with regard to learning performed using an encoder neural network and a decoder neural network, loss may include reconstruction loss and differential sparsity penalties. Here, the reconstruction loss may be the difference between an input image and a reconstructed image.

Figure 7:
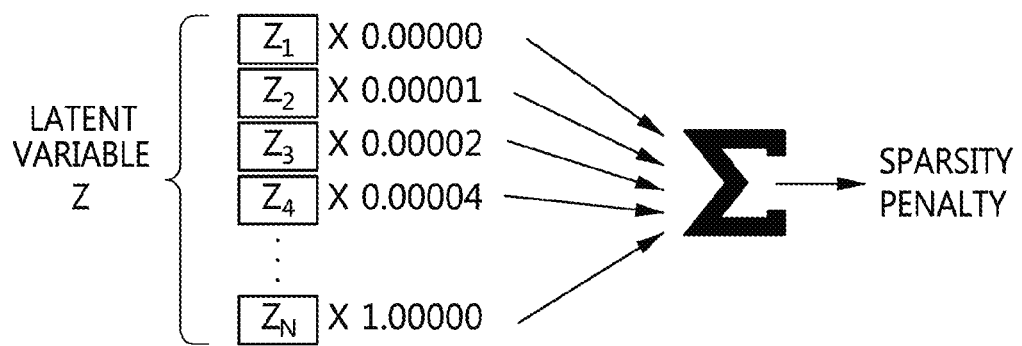
FIG. 7 shows a sparsity penalty according to an example.

FIG. 7 shows a sparsity penalty according to an example.

In FIG. 7, a latent variable Z having N components is illustrated.

When the latent variable Z has multiple components, the sparsity penalty may be a weighted sum of the values of the multiple components of the latent variable Z. In other words, different weights may be assigned to the multiple components of the latent variable Z, respectively, and multiple values may be calculated by multiplying the values of the multiple components by the weights assigned thereto, respectively. Then, the sum of the calculated multiple values may be used as the sparsity penalty.

The weight assigned to each of the multiple components may be related to the frequency with which feature information represented by the component is used in the input images that are used for learning. For example, the weight assigned to each of the multiple components may correspond to the frequency with which the feature information represented by the component is used in the input images that are used for learning. Alternatively, the weight assigned to each of the multiple components may be proportional to the frequency with which the feature information represented by the component is used in the input images that are used for learning.

For example, as the value of the differential weight is lower, a neural network may be trained such that the component to which the corresponding weight is applied represents feature information that is frequently used for various input images. Also, as the value of the differential weight is higher, the neural network may be trained such that the component to which the corresponding weight is applied represents feature information that is rarely used for various input images.

Figure 8:
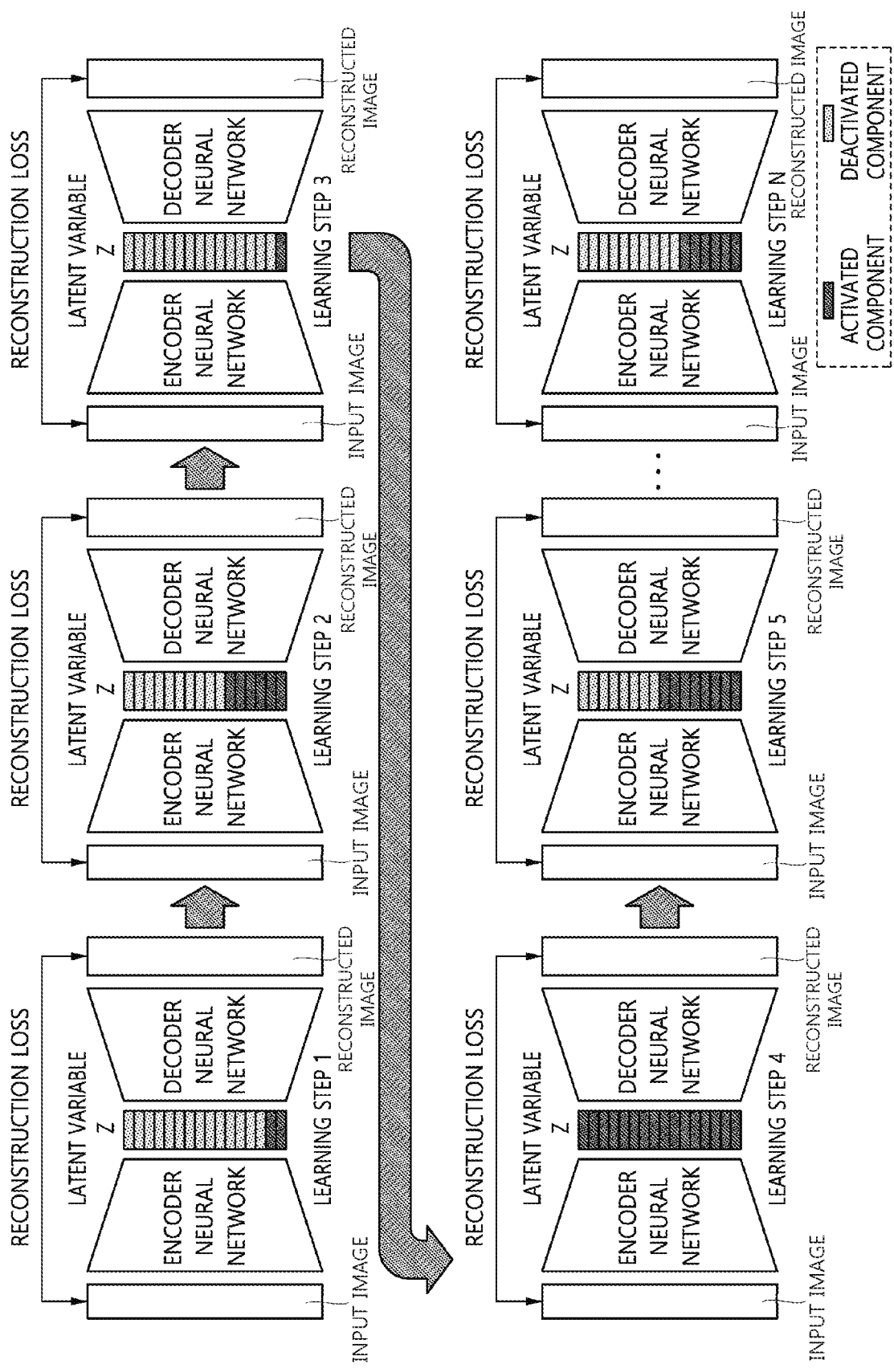
FIG. 8 shows a learning method for sorting the components of a latent variable in order of importance according to an embodiment.

FIG. 8 is a learning method for sorting the components of a latent variable in order of importance according to an embodiment.

In an embodiment, learning using only reconstruction loss may be performed. That is, the loss used in learning in a neural network of the embodiment may be reconstruction loss.

The autoencoder may perform learning. Here, the autoencoder may be at least a part of the encoder 200 or at least a part of the decoder 300. For example, the autoencoder may be included in the feature extraction unit 210 or the decoding unit 310. Alternatively, the autoencoder may be a device that is separate from the encoder 200 and the decoder 300. The autoencoder may transmit the result of learning to the encoder 200 and the decoder 300. The result of learning may include a latent variable.

For example, the loss function in learning may be calculated using the distance between the patch of an input image and that of a reconstructed image.

When it comes to learning performed using an encoder neural network and a decoder neural network, each of which includes multiple learning steps, the elements of only some high-ranking components of the latent variable Z, among the multiple components thereof, may be activated in each of the multiple learning steps. In other words, among the multiple components of the latent variable Z, the elements of an arbitrary number of low-ranking components may be deactivated in each learning step. The number of high-ranking components to be activated may be randomly set.

That is, when a single learning step is performed, an arbitrary number of components having high-ranking indices may be activated, and the remaining components may be deactivated, among all of the components of the latent variable Z. Also, when a single learning step is performed, learning may be performed only for the neural network weight value that is connected with the activated components.

In FIG. 8, an example in which learning is performed through N learning steps and in which only an arbitrary number of components of high-ranking indices is activated in each step is illustrated. In FIG. 8, as a component is placed closer to the bottom, the component is regarded as having a higher-ranking index.

In FIG. 8, as a component is ranked higher, the component may participate more frequently in learning. Also, as a component is ranked lower, the frequency with which the component participates in learning becomes lower.

Whether or not to activate each of the multiple components of a latent variable is set, whereby the probability that the component affects the magnitude of reconstruction loss may be adjusted.

When learning is performed in the above-described manner, the vector element of the component having a high-ranking index in a latent variable is more likely to affect the magnitude of reconstruction loss. Accordingly, the vector element of the component having a high-ranking index in the latent variable may represent relatively more important feature information. Conversely, the vector element of the component having a low-ranking index in the latent variable is less likely to affect the magnitude of reconstruction loss, and may represent relatively less important feature information.

As described above, among the components of the latent variable of the autoencoder, a component having a higher-ranking index may include information that is more important for the reconstruction of an image.

For model training, the number of high-ranking components involved in the reconstruction of an image, among the N components of the latent variable, may be defined using a random variable M. Although only M high-ranking components are used, the corresponding M components may include as much information required for the reconstruction as possible.

When the value of M is m, the autoencoder may regard the values of the components, excluding the m high-ranking components, as '0' for the reconstruction of an image. In this case, the components, the value of which is set to '0', may not affect the reconstruction of the image. Accordingly, when the m components are used, the autoencoder may be regarded as an autoencoder in which the total number of components of a latent variable is m.

The probability distribution of an ideal autoencoder in which the total number of components of a latent variable is m may be assumed to be $p_{opt_m}(x|x)$. The probability distribution of the autoencoder using a latent variable having m components may be $p(x|x, \theta, m)$. Here, the maximum expected value of $p(x|x, \theta, m)$ may be regarded as the expected value of $p_{opt_m}(x|x)$. The expected value of $p_{opt_m}(x|x)$ may be represented as shown in the following Equation 1.

$$E_{x \sim p(x)} p(x|x,\theta) = E_{x \sim p(x), m \sim p(m)}[p(x|x,\theta,m)] \leq E_{x \sim p(x), m \sim p(x)}[p_{opt_m}(x|x)] \quad \text{[Equation 1]}$$

In Equation 1, p(x) may denote the distribution of an input image x. p(m) may denote the prior probability of the number of high-ranking components that are used for the reconstruction of an image. In order to maximize $E_{x \sim p(x)} p(x|x,\theta)$, $p(x|x, \theta, m)$ is required to approach $p_{opt_m}(x|x)$ for each m.

The learning process to be described below may be a process for optimizing the parameter θ.

For learning in the autoencoder, the frequency with which each of the components of a latent variable participates in learning may be set differently. In order to set the frequency differently, m, corresponding to the number of components that participate in learning, may be sampled depending on the prior probability of the following Equation 2 in each learning step, and only m high-ranking components, among the components of the latent variable, may participate in learning.

$$m = \min(m', N) \text{ where } m' \sim \text{Uinf}\{1, \lfloor N/0.7 \rfloor\} \quad \text{[Equation 2]}$$

That is, the first component, which should include the most important information, may always participate in learning, and as the index of a component is increased, the frequency with which the component participates in learning may be decreased.

In order to exclude the components listed after the m-th component, element-wise multiplication between a binary mask, configured with m consecutive 1s and (N−m) consecutive 0s, and the components of the latent variable may be performed when learning is performed.

In FIG. 8, for the conciseness of representation, an example in which the total number of components of a latent variable, M, is 16 is illustrated. As the learning steps progress, a new m may be sampled, and the sampled m may be used for learning.

In an embodiment, the effect of the high-ranking components of a latent variable on the reconstructed image may be different from the effect of the low-ranking components thereof on the reconstructed image. That is, the higher the ranking of the component of the latent variable, the greater the effect of the corresponding component on the reconstructed image.

The effect of the component of a latent vector on the reconstructed image may be represented as shown in the following Equation 3.

$$g_i = \Sigma_{j=0}^{c} \Sigma_{k=0}^{w} \Sigma_{l=0}^{h} |d\hat{x}_{j,k,l}/dz_i| \quad \text{[Equation 3]}$$

In Equation 3, $g_i$ may denote the effect of $z_i$, which is the i-th component of the latent variable z, on the output of the autoencoder. $\hat{x}_{j,k,l}$ may denote the component values of the j-th channel and the (k,l) coordinates of c may denote the number of channels of $\hat{x}$. w may denote the width of $\hat{x}$. h may denote the height of $\hat{x}$.

The effects of the respective components of a latent variable on image reconstruction may be different from each other. In order to perform normalization on a latent variable signal based on the different effects, element-wise multiplication between z and g may be used. Through such element-wise multiplication, the final transform signal may be generated.

The autoencoder may include a transformer neural network and an inverse-transformer neural network.

For example, the transformer neural network may transform a 8×8 Red, Green and Blue (RGB) image patch x into 192 latent variables z using a convolution layer and a fully connected (FC) layer. The convolution layer may include five layers. The transformer neural network may acquire the final transformed signal through element-wise multiplication between g and z. g may represent the degree by which components affect image reconstruction.

The inverse-transformer neural network may generate a reconstructed image patch $\hat{x}$ for the image patch x by reversing the above-described transform process performed by the transformer neural network.

Because the element-wise multiplication between z and g is not required for learning, the process of the element-wise multiplication between z and g may be skipped in the learning process. In contrast, a binary masking process for the latent variable z may be performed only in the learning process, and may not be applied in a test for the autoencoder.

Figure 9:
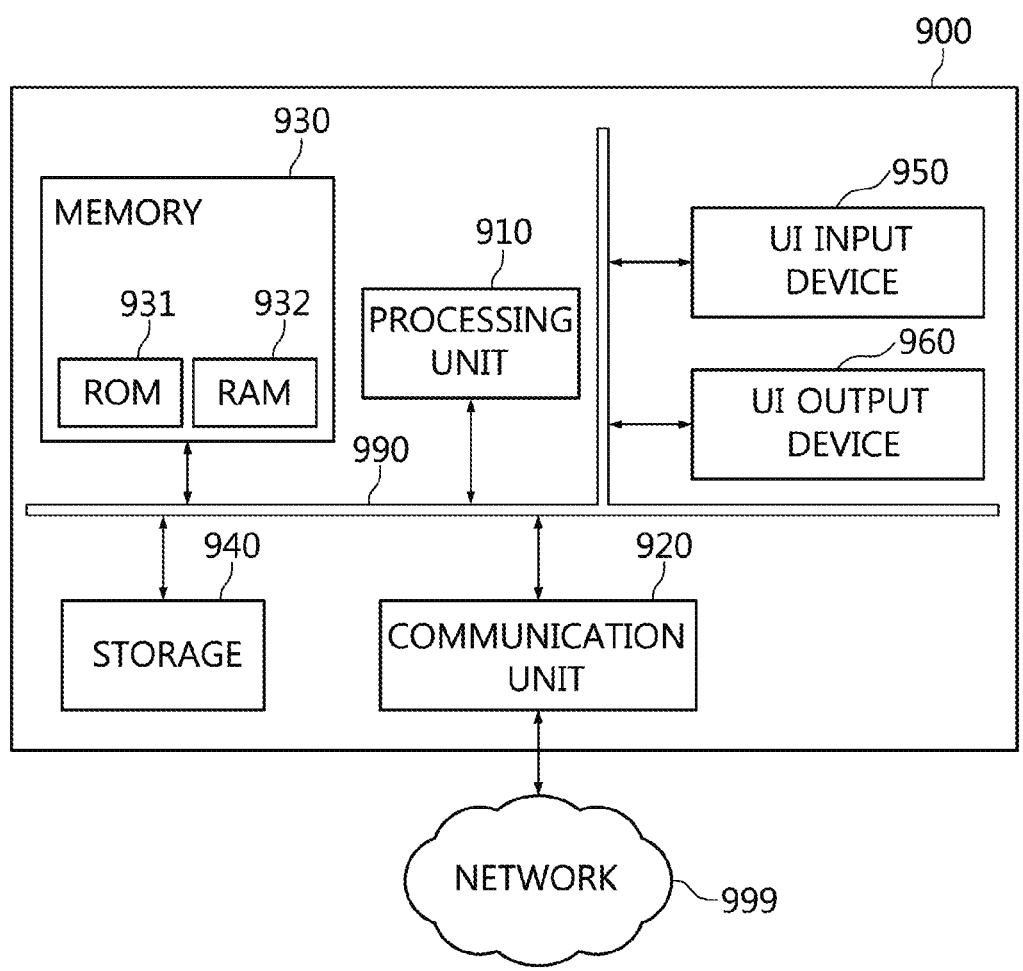
FIG. 9 illustrates an electronic device for implementing an encoder according to an embodiment.

FIG. 9 illustrates an electronic device for implementing the encoder according to an embodiment.

The encoder 200 may be implemented as the electronic device 900 illustrated in FIG. 9. The electronic device 900 may be a general-purpose computer system that operates as the encoder 200.

As illustrated in FIG. 9, the electronic device 900 may include at least some of a processing unit 910, a communication unit 920, memory 930, storage 940, and a bus 990. The components of the electronic device 900, such as the processing unit 910, the communication unit 920, the memory 930, the storage 940, and the like, may communicate with each other via the bus 990.

The processing unit 910 may be a semiconductor device for executing processing instructions stored in the memory 930 or the storage 940. For example, the processing unit 910 may be at least one hardware processor.

The processing unit 910 may process tasks required for the operation of the electronic device 900. The processing unit 910 may execute code pertaining to the operations or steps of the processing unit 910 described in the embodiments.

The processing unit 910 may generate, store and output information, and may perform other operations of the steps performed in the electronic device 900.

The communication unit 920 may be connected with a network 999. The communication unit 920 may receive data or information required for the operation of the electronic device 900 and transmit data or information required for the operation of the electronic device 900. The communication unit 920 may transmit data to other devices through the network 999 and receive data from other devices. For example, the communication unit 920 may be a network chip or a port.

The memory 930 and the storage 940 may be various types of volatile or nonvolatile storage media. For example, the memory 930 may include at least one of ROM 931 and RAM 932. The storage 940 may include internal storage media, such as RAM, flash memory, a hard disk, and the like, and detachable storage media, such as a memory card and the like.

The function or operation of the electronic device 900 may be performed when the processing unit 910 executes at least one program module. The memory 930 and/or the storage 940 may store at least one program module. The at least one program module may be configured to be executed by the processing unit 910.

At least some of the feature extraction unit 210, the latent variable selection unit 220, and the encoding unit 230 of the above-described encoder 200 may be at least one program module.

Program modules in the form of an operating system, an application module, a library, and other program modules may be included in the electronic device 900, and may be physically stored in various known memory devices. Also, at least some of the program modules may be stored in a remote memory device that is capable of communicating with the electronic device 900. Meanwhile, the program modules may include a routine, a subroutine, a program, an object, a component, a data structure, and the like for executing a specific operation or task or implementing a specific abstract data type according to an embodiment, but the program modules are not limited thereto.

The electronic device 900 may further include a user interface (UI) input device 950 and a UI output device 960. The UI input device 950 may receive user input required for the operation of the electronic device 900. The UI output device 960 may output information or data based on the operation of the electronic device 900.

Figure 10:
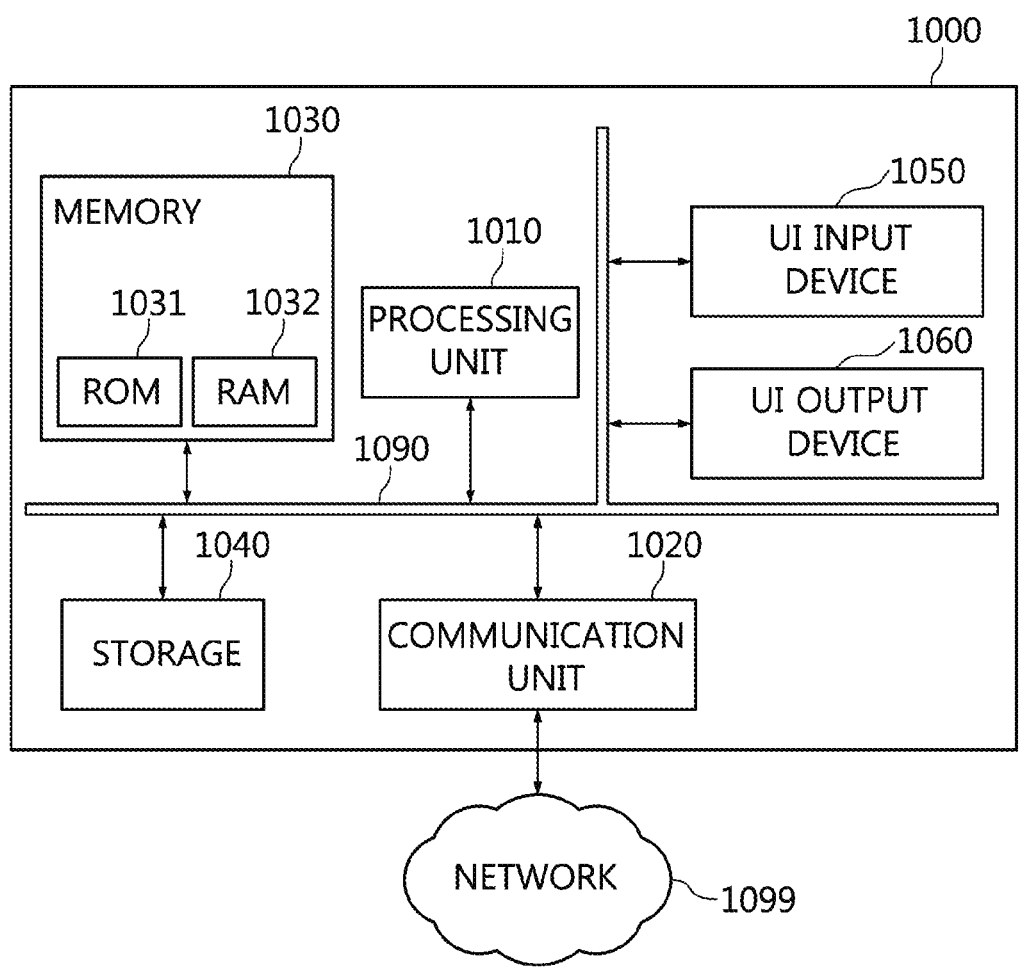
FIG. 10 illustrates an electronic device for implementing a decoder according to an embodiment.

FIG. 10 illustrates an electronic device for implementing the decoder according to an embodiment.

The decoder 300 may be implemented as the electronic device 1000 illustrated in FIG. 10. The electronic device 1000 may be a general-purpose computer system that operates as the decoder 300.

As illustrated in FIG. 10, the electronic device 1000 may include at least some of a processing unit 1010, a communication unit 1020, memory 1030, storage 1040, and a bus 1090. The components of the electronic device 1000, such as the processing unit 1010, the communication unit 1020, the memory 1030, the storage 1040, and the like, may communicate with each other via the bus 1090.

The processing unit 1010 may be a semiconductor device for executing processing instructions stored in the memory 1030 or the storage 1040. For example, the processing unit 1010 may be at least one hardware processor.

The processing unit 1010 may process tasks required for the operation of the electronic device 1000. The processing unit 1010 may execute code pertaining to the operations or steps of the processing unit 1010 described in the embodiments.

The processing unit 1010 may generate, store and output information, and may perform other operations of the steps performed in the electronic device 1000.

The communication unit 1020 may be connected with a network 1099. The communication unit 1020 may receive data or information required for the operation of the electronic device 1000 and transmit data or information required for the operation of the electronic device 1000. The communication unit 1020 may transmit data to other devices through the network 1099 and receive data from other devices. For example, the communication unit 1020 may be a network chip or a port.

The memory 1030 and the storage 1040 may be various types of volatile or nonvolatile storage media. For example, the memory 1030 may include at least one of ROM 1031 and RAM 1032. The storage 1040 may include internal storage media, such as RAM, flash memory, a hard disk, and the like, and detachable storage media, such as a memory card and the like.

The function or operation of the electronic device 1000 may be performed when the processing unit 1010 executes at least one program module. The memory 1030 and/or the storage 1040 may store at least one program module. The at least one program module may be configured to be executed by the processing unit 1010.

At least some of the decoding unit 310, the latent variable recovery unit 320, and the image reconstruction unit 330 of the above-described decoder 300 may be at least one program module.

Program modules in the form of an operating system, an application module, a library, and other program modules may be included in the electronic device 1000, and may be physically stored in various known memory devices. Also, at least some of the program modules may be stored in a remote memory device that is capable of communicating with the electronic device 1000. Meanwhile, the program modules may include a routine, a subroutine, a program, an object, a component, a data structure, and the like for executing a specific operation or task or implementing a specific abstract data type according to an embodiment, but the program modules are not limited thereto.

The electronic device 1000 may further include a user interface (UI) input device 1050 and a UI output device 1060. The UI input device 1050 may receive user input required for the operation of the electronic device 1000. The UI output device 1060 may output information or data based on the operation of the electronic device 1000.

Figure 11:
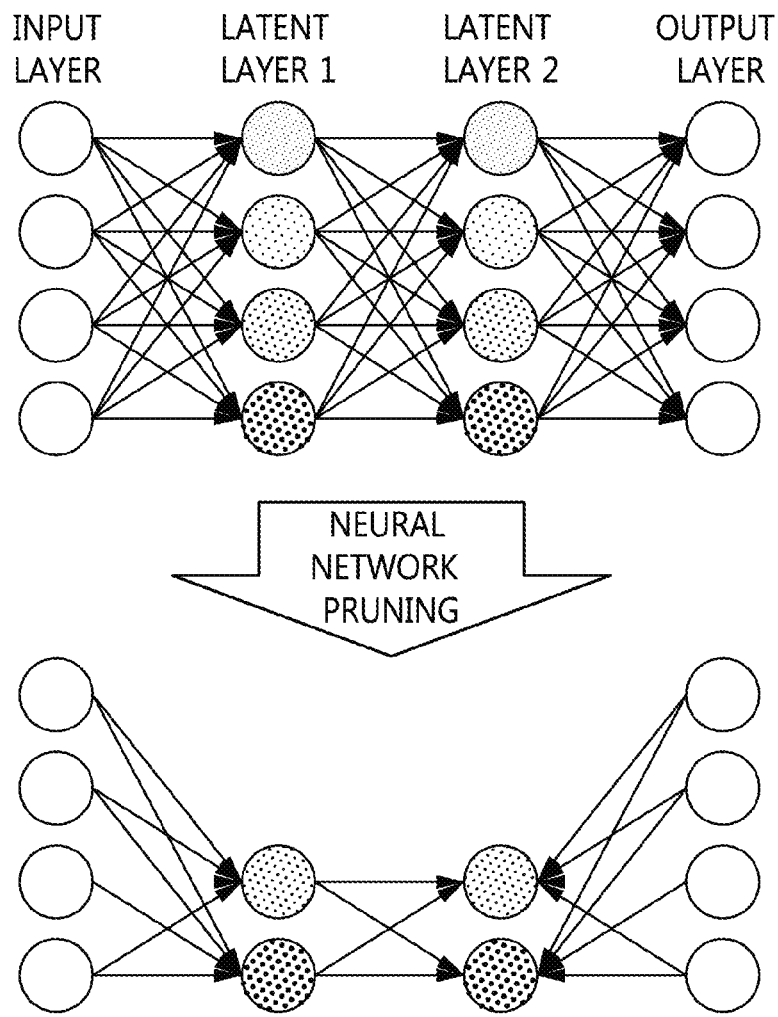
FIG. 11 shows a neural-network-pruning method according to an embodiment.

FIG. 11 shows a neural-network-pruning method according to an embodiment.

The sorting method of a latent variable based on importance according to an embodiment may be used for neural network pruning. Here, the encoder 200 that performs neural network pruning may be referred to as a neural network pruning device or the like.

At the above-described step 410 in FIG. 4, the feature extraction unit 210 may acquire a latent variable. The components of the acquired latent variable may be sorted in order of importance.

At the above-described step 420 in FIG. 4, processing related to the latent variable may be neural network pruning.

Neural network pruning may be eliminating a node having low importance from a neural network.

As illustrated in FIG. 11, the neural network may have an input layer and an output layer, and may have multiple latent layers between the input layer and the output layer. In FIG. 11, two latent layers are illustrated by way of example.

Figure 12:
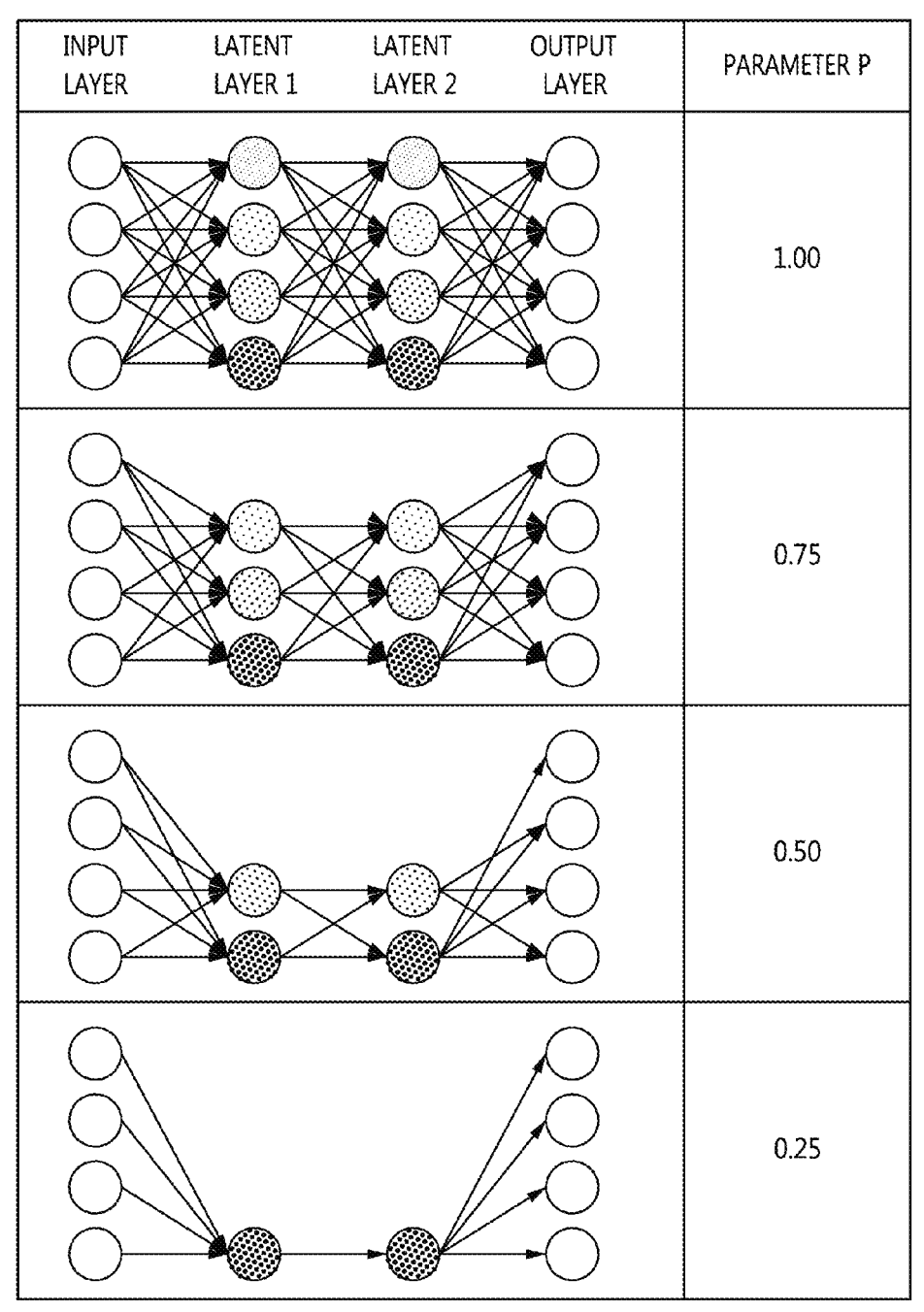

In FIG. 11 and FIG. 12 to be described below, a node having higher importance is marked in a darker shade.

A single layer may include multiple nodes. The node of a neural network may correspond to the above-described component of a latent variable. Alternatively, the multiple components of a latent variable may correspond to the respective nodes of a layer of a neural network. For example, when the index of the node of a neural network is the same as that of the component of a latent variable, they may correspond to each other.

In other words, the above description of the component of a latent variable may be applied to the node of a layer.

Sorting in a latent variable in the embodiment may be simultaneously applied to multiple layers. In FIG. 11, the shade of the respective nodes in the two latent layers may represent the importance of the nodes that are sorted based on learning of the nodes.

The latent variable selection unit 220 may preferentially eliminate the node having the lowest importance in order to reduce the number of nodes in the neural network. Alternatively, assuming that N nodes of the latent layer are sorted in order from the lowest importance to the highest importance, the latent variable selection unit 220 may eliminate the first M nodes therefrom.

This neural network pruning may be applied not only to video and image compression but also to neural networks having various purposes, and sorting of the components of a latent variable according to the importance thereof may be applied to neural networks having various purposes in the same manner.

FIG. 12 illustrates a method for providing a neural network having different performance levels based on a single trained neural network to which a neural-network-pruning method according to an embodiment is applied.

At the above-described step 420 in FIG. 4, the latent variable selection unit 220 may perform neural network pruning.

The latent variable selection unit 220 may derive other neural networks having various performance levels and complexity levels from a single neural network by defining a parameter. The latent variable selection unit 220 may derive multiple neural networks from a single neural network by using a parameter that represents the degree of pruning of a neural network. The multiple neural networks may differ from each other with regard to performance and complexity.

The parameter may be the number or percentage of nodes used in each of the multiple latent layers of a neural network. That is, the latent variable selection unit 220 defines the number or percentage of nodes used in each of the multiple latent layers of a neural network, thereby deriving different neural networks having different performance and complexity levels from a single neural network.

In FIG. 12, the value of the parameter p is illustrated on the right side, and a neural network based on the value of the parameter p is illustrated on the left side.

As illustrated in FIG. 12, for example, the parameter p may be a percentage of the nodes that are used, among the nodes of each of the latent layers. Alternatively, the parameter p may be the percentage of nodes to be activated, among the nodes of each of the latent layers.

Alternatively, for example, the parameter p may be the number of nodes that are being used, among the nodes of each of the latent layers.

The parameter p may be common to all of the latent layers. Alternatively, the parameter p may be used for each of the multiple latent layers of a neural network.

The parameter p may be transmitted from another device to the neural network pruning device according to need, and may be transmitted between neural network pruning devices. Alternatively, an encoded bitstream may include the parameter p. The encoder 200 may include the parameter p in the bitstream. The decoder 300 may acquire the parameter p from the bitstream.

When it comes to video and image compression, information about the parameter p may be transmitted as additional information, whereby the compression ratio and distortion may be controlled. Alternatively, the parameter p may be used as profile information for applying a neural network suitable for the performance level of a device to the device. For example, using the parameter p, a latent layer having a high percentage of used nodes may be used in a device having high performance, and a latent layer having a low percentage of used nodes may be used in a device having low performance.

The apparatus described above may be implemented through hardware components, software components, and/or a combination thereof. For example, the system, devices and components described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor, and any other device capable of executing instructions and responding thereto. The processing device may run an operating system (OS) and one or more software applications executed on the OS. Also, the processing device may access, store, manipulate, process, and create data in response to the execution of the software. For the convenience of description, the processing device is described as a single device, but those having ordinary skill in the art may understand that the processing device may include multiple processing elements and/or multiple forms of processing elements. For example, the processing device may include multiple processors or a single processor and a single controller. Also, other processing configuration such as parallel processors may be available.

Software may include a computer program, code, instructions, or a combination thereof, and may configure a processing device to be operated as desired, or may independently or collectively instruct the processing device to be operated. Software and/or data may be permanently or temporarily embodied in a specific form of machines, components, physical equipment, virtual equipment, computer storage media or devices, or transmitted signal waves in order to be interpreted by a processing device or to provide instructions or data to the processing device. Software may be distributed to computer systems connected with each other via a network, and may be stored or run on distributed method. Software and data may be stored in one or more computer-readable storage media.

The method according to the embodiments may be implemented as program instructions executable by various computer devices, and may be recorded in computer-readable storage media. The computer-readable storage media may separately or collectively include program instructions, data files, data structures, and the like. The program instructions recorded in the media may be specially designed and configured for the embodiment, or may be available by being well known to computer software experts.

The computer-readable storage media may include information used for the embodiments according to the present invention. For example, the computer-readable storage media may include a bitstream, and the bitstream may comprises information described in the embodiments according to the present invention.

The computer-readable storage media may include a non-transitory computer-readable medium.

Examples of the computer-readable storage media includes magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter. The above-mentioned hardware device may be configured such that it operates as one or more software modules in order to perform the operations of the embodiment, and vice-versa.

Although the embodiments of the present invention have been disclosed for illustrative purposes, those skilled in the art will appreciate that various modifications, additions and substitutions are possible, without departing from the scope and spirit of the invention. For example, if the described techniques are performed in a different order, if the described components, such as systems, architectures, devices, and circuits, are combined or coupled with other components by a method different from the described methods, or if the described components are replaced with other components or equivalents, the results are still to be understood as falling within the scope of the present invention.

The invention claimed is:

1. A processing method, comprising:
    acquiring a latent variable; and
    performing selection or processing related to the latent variable,
    wherein multiple components of the latent variable are sorted in a specific order, and
    wherein the latent variable is acquired through an encoder neural network that is trained in advance.

2. The processing method of claim 1, wherein the multiple components are sorted in order of importance.

3. The processing method of claim 1, wherein loss in learning in a neural network includes reconstruction loss and a sparsity penalty, and the sparsity penalty is a sum of values of the multiple components of the latent variable to which weights are assigned, respectively.

4. The processing method of claim 3, wherein the weight assigned to each of the multiple components is related to a frequency with which feature information represented by the component is used in input images that are used for learning.

5. The processing method of claim 1, wherein, in learning in a neural network configured with multiple learning steps, elements of only some components having high-ranking indices, among the multiple components of the latent variable, are activated in each of the multiple steps.

6. The processing method of claim 5, wherein a number of activated components having the high-ranking indices is randomly set.

7. The processing method of claim 5, wherein whether to activate each of the multiple components of the latent variable is determined, whereby a probability that the component affects a magnitude of the reconstruction loss is adjusted.

8. The processing method of claim 1, wherein the selection is eliminating, from the latent variable, information that is less important for reconstruction of an image.

9. The processing method of claim 1, wherein the processing is reducing an amount of data for the latent variable by eliminating a specific component, among the multiple components of the latent variable.

10. The processing method of claim 9, wherein the specific component is at least one component having a lowest importance.

11. The processing method of claim 1, wherein the processing is quantization for the latent variable.

12. The processing method of claim 1, wherein:
    the multiple components are sorted in order of importance,
    the processing is neural network pruning, and
    the neural network pruning is eliminating nodes having a lowest importance, among nodes of a latent layer of a neural network.

13. The processing method of claim 12, wherein multiple neural networks are derived from the neural network using a parameter that indicates a degree of pruning in the neural network pruning.

14. A processing method, comprising:
    generating a reconstructed image using a decoder neural network to which a latent variable is applied,
    wherein multiple components of the latent variable are sorted in a specific order, and
    wherein the latent variable is acquired through an encoder neural network that is trained in advance.

15. The processing method of claim 14, wherein the multiple components are sorted in order of importance.

16. The processing method of claim 14, further comprising:
    generating the latent variable using latent variable generation information.

17. The processing method of claim 14, wherein the reconstructed image is generated using feature information of only some components having high-ranking indices, among the multiple components of the latent variable.

18. The processing method of claim 17, wherein a ranking of each of the multiple components is determined based on a component index thereof.

19. A computer-readable recording medium in which a bitstream is stored, the bitstream comprising:
    latent variable generation information,
    wherein:
        a latent variable is generated using the latent variable generation information,
        a reconstructed image is generated using a decoder neural network to which the latent variable is applied, and
        multiple components of the latent variable are sorted in a specific order, and
    wherein the latent variable is acquired through an encoder neural network that is trained in advance.

* * * * *